United States Patent [19]
Ishiyama

[11] 4,350,416
[45] Sep. 21, 1982

[54] COMPACT ZOOM LENS

[75] Inventor: Shozo Ishiyama, Hachioji, Japan

[73] Assignee: Konishiroku Photo Industry Co., Ltd., Japan

[21] Appl. No.: 138,932

[22] Filed: Apr. 10, 1980

[30] Foreign Application Priority Data

Apr. 12, 1979 [JP] Japan .................... 54-43591

[51] Int. Cl.³ ............................................. G02B 15/16
[52] U.S. Cl. .................................................. 350/427
[58] Field of Search ......................................... 350/427

[56] References Cited
U.S. PATENT DOCUMENTS
4,025,167  5/1977  Ikeda ................................. 350/427

*Primary Examiner*—Bruce Y. Arnold
*Attorney, Agent, or Firm*—Linda G. Bierman; Jordan B. Bierman

[57] ABSTRACT

A compact zoom lens of mechanical compensation type is described which comprises first, second, third and fourth lens groups arranged so that variation of image position caused when the second lens group is moved along the optical axis for the purpose of varying the focal length is compensated by moving the third lens group so as to form a locus of points concave toward the object side. The zoom lens as a whole is made compact by compactly arranging the vari-focal lens groups, which comprise the first through third lens groups, by making the amounts of movements of the second and third lens groups small and by arranging the vari-focal lens group itself so that the focal length of the fourth lens group becomes short.

6 Claims, 7 Drawing Figures

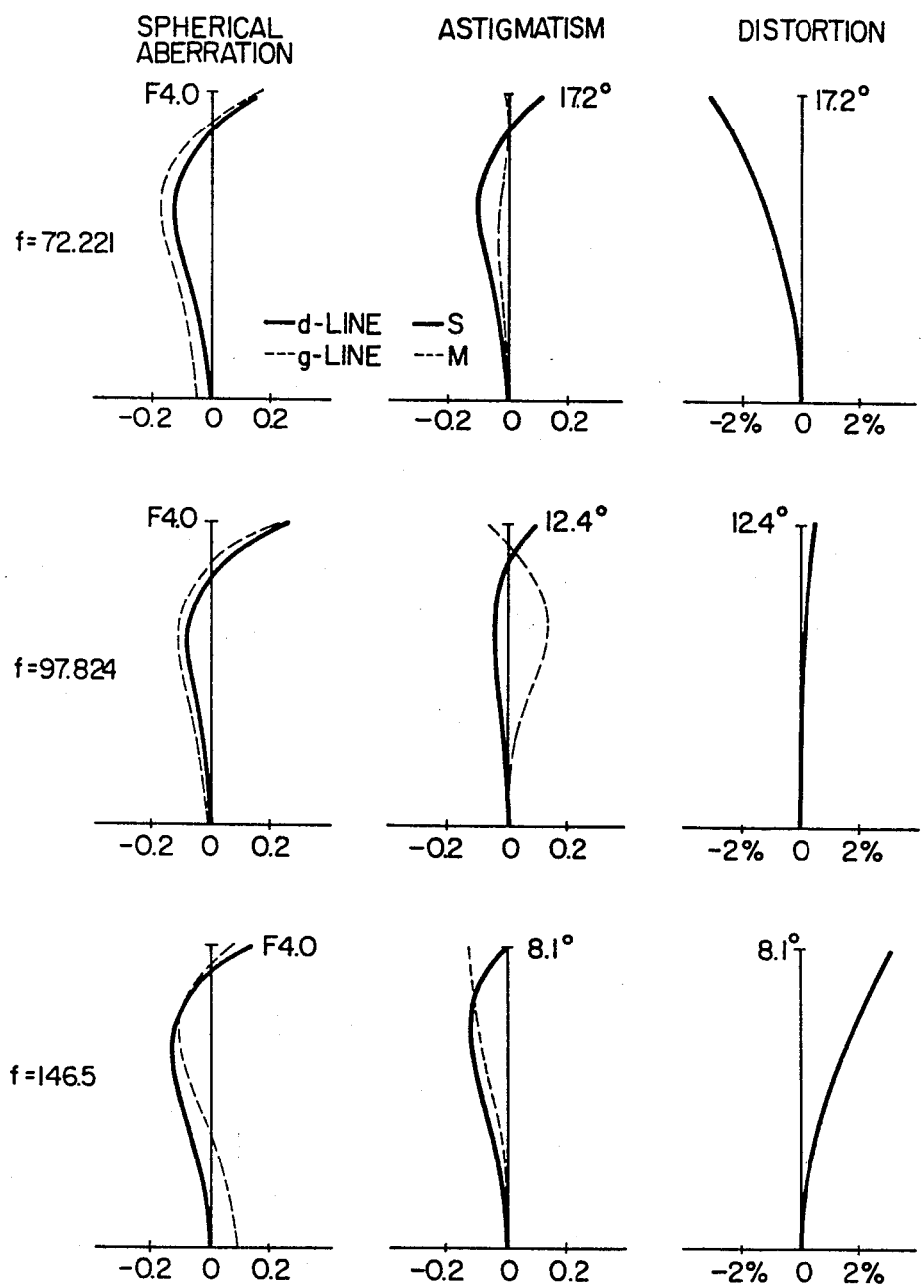

COMPACT ZOOM LENS

BACKGROUND OF THE INVENTION

1. Field of the Invention

The present invention relates to a compact zoom lens and, more particularly, to a compact zoom lens which comprises a positive, negative and positive lens groups constituting a vari-focal lens group and a positive lens group constituting a relay lens group, i.e., four lens groups in total, and for which the field angle is about 16 degrees to 35 degrees and telephoto ratio is smaller than 1.

2. Description of the Prior Art

Among so-called mechanical compensation type zoom lenses which are widely known, there are zoom lenses having lens configuration similar to the above and arranged to vary the focal length by moving the second lens group in the direction of an optical axis thereof and to move the third lens group so that it forms a locus concave toward the object side in order to compensate the variation of final image position to be caused by the above-mentioned movement of the second lens group. For this kind of zoom lenses, especially for such zoom lenses for which the range of focal length is 70 to 150 mm when converted to 35 mm format (film size 24 mm×36 mm) and for F number about F:4, it is desirable to make the telephoto ratio (i.e., the value obtained by dividing the distance from the front lens surface to the final image surface by the focal length at the longest focal length) smaller than 1 for the purpose of making the lens compact. However, it has been difficult to do so from the view point of correction of aberrations.

SUMMARY OF THE INVENTION

It is, therefore, a primary object of the present invention to provide a compact zoom lens having the above-mentioned lens configuration for which the telephoto ratio is smaller than 1 and aberrations are corrected favourably.

For arranging this kind of zoom lens compactly, the following methods are considered.

(1) To make the vari-focal lens group small by making the focal lengths of respective lens groups constituting the vari-focal lens group short.

(2) To make the vari-focal lens group small by making the amounts of movements of the second and third lens groups small without changing the focal lengths of respective lens groups constituting the vari-focal lens group.

(3) To arrange the vari-focal lens group so that the focal length of the fourth lens group becomes short.

(4) To make the telephoto ratio of the fourth lens group small.

When the method (1) is adopted out of the above, refractive powers of respective lens groups constituting the vari-focal lens group become stronger and it becomes difficult to correct aberrations favourably. On the other hand, the method (4) can be utilized for making the zoom lens as a whole compact regardless of arrangement of vari-focal lens group and, therefore, it may be considered separately from the methods (1) through (3).

The present invention provides a new type of compact zoom lens which is not yet known by utilizing the above-mentioned methods (2) and (3). Effectiveness of methods (2) and (3) is described below.

FIG. 5A shows an example of graph illustrating the loci of movement of the second lens group constituting the vari-focal lens group comprising a positive, negative and positive lens groups and the third lens group, respectively. FIG. 5B shows a graph illustrating the relation between the amount of movement of the second lens group and variation of magnification in the above example. When, for example, the zoom ratio is made 2 in FIG. 5B, movement of the second lens group becomes as follows. That is, when one end of movement of the second lens group is the point a, the other end is the point b. When one end of movement of the second lens group is the point c, the other end is the point d. As it will be appreciated from the figure, the amount of movement a-b is smaller as compared with the amount of movement c-d. Points a, b, c and d in FIG. 5A respectively correspond to points a, b, c and d in FIG. 5B. From the above, it is understood that it is effective for making the vari-focal lens group smaller when such points where the second and third lens groups are as near as possible to each other are selected as the ends of movements of respective lens groups.

FIG. 6 shows the paraxial ray and the arrangement of the four lens groups, represented as in the paraxial theory, at the longest focal distance of the zoom lens comprising four lens groups, i.e., a positive, negative, positive and positive lens group, in order. The height of exit ray $h_3$ of the paraxial ray from the third lens group is expressed by the following formula when the focal lengths of the first and second lens groups are represented by reference symbols $f_A$ and $f_B$, the airspace between the first and second lens groups is represented by reference symbol $t_1$, the airspace between the second and third lens groups is represented by reference symbol $t_2$, and it is taken that the value of height of incidence $h_1$ of paraxial ray upon the first lens group is equal to the longest focal length $f_T$.

$$h_3 = f_T - f_T k_A t_1 - f_T t_2 (k_A + k_B - k_A k_B t_1)$$

where, $$k_A = 1/f_A \text{ and } k_B = 1/f_B$$

As it is widely known, exit rays from the third lens group of this kind of zoom lens become approximately parallel with the optical axis. Therefore, when reference symbol $f_D$ represents the focal length of the fourth lens group, $f_D$ becomes approximately equal to the above $h_3$ because the relation $f_D/f_T = h_3/h_1$ is approximately true.

Consequently, the conditions for materializing the aforementioned method (3), in other words, the conditions for making $f_D$, i.e., $h_3$ small become as follows.

$$\partial h_3 / \partial k_A = -f_T t_1 - f_T t_2 + f_T k_B t_1 t_2$$

$$\partial h_3 / \partial t_1 = -f_T k_A + f_T t_2 k_A k_B$$

$$\partial h_3 / \partial t_2 = -f_T (k_A + k_B - k_A k_B t_1)$$

As $k_A > 0$ and $k_B < 0$, $\partial h_3 / \partial k_A < 0$ and $\partial h_3 / \partial t_1 < 0$ and, therefore, $h_3$ becomes small when $k_A$ is made large or $t_1$ is made large. When, however, $t_1$ is made large, $k_A$ becomes necessarily small ($f_A$ becomes large) and this becomes a contradictory requirement. Moreover, when $f_A$ is made small, difficulties are caused in the same way as the case of the afore-mentioned method (1). And when $t_1$ is made large, it becomes impossible to make the zoom lens compact.

In case of a zoom lens for which $k_A>0$, $k_B<0$ and zoom ratio is small, it is $k_A+k_B-k_Ak_Bt_1<0$. Therefore, $\partial h_3/\partial t_2>0$ and $h_3$ becomes small when $t_2$ is made small. It is possible to make $t_2$ small when the distance between the secondary principal point of the second lens group and primary principal point of the third lens group is made small.

As explained so far, objects of both of the methods (2) and (3) for arranging a zoom lens compactly are attained when the distance between the secondary principal point of the second lens group and primary principal point of the third lens group is made as small as possible.

This invention will become more apparent from the following detailed description of the preferred embodiment thereof in conjunction with the accompanying drawings and tables.

BRIEF DESCRIPTION OF THE DRAWINGS

FIGS. 2, 3 and 4 respectively show graphs of aberration curves of respective embodiments at respective focal lengths;

DETAILED DESCRIPTION OF THE PREFERRED EMBODIMENTS

Figure 1:
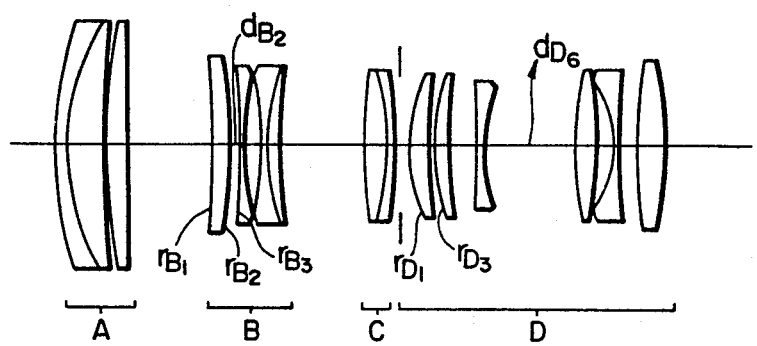
FIG. 1 shows a sectional view of zoom lens illustrating the embodiments of the present invention.
Figure 6:
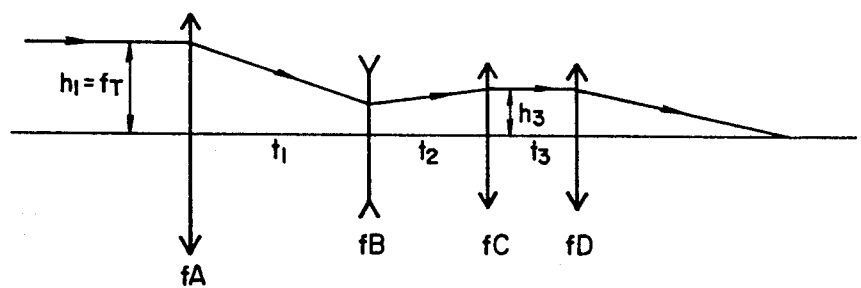
FIG. 6 shows a graph illustrating the arrangement of the four lens groups and the paraxial ray at the longest focal length.

In the present invention, the above-mentioned condition is fulfilled by shifting the secondary principal point of the second lens group toward the image side by using a positive lens as a first lens component of the second lens group.

The vari-focal lens group for attaining the above-mentioned purpose comprises a first positive lens group for focusing, a second negative lens group for variation of focal length, and a third positive lens group for compensation of image position, and is arranged as a vari-focal lens group of a mechanical compensation type zoom lens in which the second lens group is moved in the direction of the optical axis for the purpose of varying the focal length and the variation of image position caused by the above movement is compensated by moving the third lens group so that it forms a locus concave toward the object side. The first lens group has a two-component, three-element, lens configuration in which one lens component is a positive cemented doublet consisting of a negative lens element and positive lens element and the other lens component is a positive lens, the second lens group has a three-component, four-element, lens configuration in which, in the order from the object side, the first lens component is a positive meniscus lens concave toward the object side, the second lens component is a negative biconcave lens of which a concave surface with a small radius of curvature is arranged toward the image side, and the third lens component is a negative cemented doublet consisting of a negative biconcave lens and positive meniscus lens concave toward the image side, and the third lens group has a single-component, single-element, lens configuration of a positive lens or single-component, two-element lens configuration of a positive cemented doublet consisting of a positive lens element and negative lens element. Additionally, the vari-focal lens group of the zoom lens according to the present invention fulfills the following conditions:

$$-\infty < r_{B1} < -7|f_B| \qquad (1)$$

$$-5|f_B| < r_{B2} < -3|f_B| \qquad (2)$$

$$-6|f_B| < r_{B3} < -3|f_B| \qquad (3)$$

$$d_{B2} < 0.12|f_B| \qquad (4)$$

wherein, $f_B$ = Focal length of the second lens group as a whole, $r_{Bi}$ = Radius of curvature of ith lens surface in the second lens group in the order from the object side, and $d_{Bi}$ = ith distance between lens surfaces in the second lens group in the order from the object side.

These conditions are required in order to reduce the differences between the values of aberrations at respective focal lengths when varying the focal length. That is, the conditions (1) and (3) related to $r_{B1}$ and $r_{B3}$ are required for reducing the differences between values of coma and astigmatism to be caused at respective focal lengths. If $r_{B1}$ becomes larger than the upper limit of condition (1) or $r_{B3}$ becomes larger than the upper limit of condition (3), coma and astigmatism at the medium focal length toward the shortest focal length will be overcorrected as compared with coma and astigmatism at the longest focal length. Besides, curvature of sagittal image surface at the medium focal length toward the shortest focal length becomes convex toward the image side and the astigmatic difference becomes large.

If, in contrast with the above, $r_{B1}$ does not fulfill the lower limit of condition (1) and this surface becomes concave toward the image side or $r_{B3}$ becomes smaller than the lower limit of condition (3), coma and astigmatism at the medium focal length toward the shortest focal length will be undercorrected as compared with coma and astigmatism at the longest focal length.

If $r_{B2}$ becomes smaller than the lower limit of condition (2), then the positive refractive power of the lens component on the image side in the second lens group becomes small. As a result, it becomes impossible to shift the secondary principal point of the second lens group toward the image side and it becomes difficult to make the vari-focal lens group compact. Moreover, curvature of sagittal image surface at the medium focal length toward the shortest focal length becomes convex toward the image side and the astigmatic difference becomes large.

If, in contrast with the above, $r_{B2}$ becomes larger than the upper limit of condition (2), rays of short wavelength cause negative coma flare of large value at the side of the short focal length thereof and, at the same time, distortion as a whole becomes excessively positive.

To shift the secondary principal point of the second lens group toward the image side, it is more advantageous when $d_{B2}$ is larger. If, however, $d_{B2}$ becomes larger than the upper limit of condition (4), rays of short wavelength cause negative coma flare of large value at the side of the short focal length thereof and, at the same time, distortion as a whole becomes excessively positive.

As for the differences between the values of aberration caused by variation of focal length when the conditions (1) through (4) are not fulfilled as described above, it is impossible to correct them by the other lens groups in the vari-focal lens group, i.e., the first and third lens groups.

As explained so far, the vari-focal lens group of the zoom lens according to the present invention enables one to compactly arrange the vari-focal lens group itself and, at the same time, to adopt a fourth lens group having a short focal length $f_D$ as the relay lens group and, thereby enabling the zoom lens as a whole to be compact. When the telephoto ratio of the fourth lens group is made small, it is possible to make the zoom lens as a whole more compact.

The fourth lens group adopted for the above purpose has a six-component, six-element, lens configuration of first through sixth lens components, in order, from the object side. The first and second lens components are positive meniscus lenses concave toward the image side, and the third lens component is a negative lens having a concave surface with a small radius of curvature arranged toward the image side. The fourth lens component is a positive biconvex lens having a large airspace compared to the third lens component, and the fifth lens component is a biconcave lens having a concave surface with a small radius of curvature is arranged toward the object side. The sixth lens component is a biconvex lens, and the fourth lens group is arranged to fulfill the following conditions:

$$0.2f_D < r_{D1} < 0.32f_D \quad (5)$$

$$0.25f_D < r_{D3} < 0.35f_D \quad (6)$$

$$1.45 < n_{D1} < 1.6 \quad (7)$$

$$1.45 < n_{D2} < 1.6 \quad (8)$$

$$1.65 < n_{D3} \quad (9)$$

wherein,
$r_{Di}$ = Radius of curvature of ith lens surface in the fourth lens group in the order from the object side,
$n_{Di}$ = Refractive index of ith lens in the fourth lens group in the order from the object side, and
$f_D$ = Focal length of the fourth lens group as a whole.

The conditions (5) and (6) are required for making the telephoto ratio small by keeping spherical aberration and coma favorable and it is especially characterized in that the refractive power of the surface on the object side of the second lens component is made strong. If $r_{D1}$ becomes larger than the upper limit of condition (5) or $r_{D3}$ becomes larger than the upper limit of condition (6), it becomes difficult to make the telephoto ratio small and, moreover, spherical aberration and coma will be undercorrected.

When, in contrast with the above, $r_{D1}$ becomes smaller than the lower limit of condition (5) or $r_{D3}$ becomes smaller than the lower limit of condition (6), spherical aberration and coma will be overcorrected though it is possible to make the telephoto ratio small.

The condition (7), (8) and (9) are required for keeping Petzval's sum at adequate value and, moreover, the conditions (7) and (8) are required also for keeping spherical aberration and coma favorably. Petzval's sum of the zoom lens as a whole becomes too small and curvature of field becomes large when $n_{D1}$ becomes larger than the upper limit of condition (7), $n_{D2}$ becomes larger than the upper limit of condition (8) or $n_{D3}$ becomes smaller than the lower limit of condition (9).

If, in contrast with the above, $n_{D1}$ becomes smaller than the lower limit of condition (7) or $n_{D2}$ becomes smaller than the lower limit of condition (8), spherical aberration and coma will be undercorrected.

The conditions (5), (6), (7) and (8) consequently define the refractive powers of surfaces on the object side of the first and second lens components. For favourable distribution of refractive powers of the first through third lens components, it is preferable to additionally fulfill the following conditions:

$$0.31f_D < f_{D1.2} < 0.4f_D \quad (10)$$

$$0.9f_D < f_{D1.3} < 1.1f_D \quad (11)$$

wherein,
$f_{D1.2}$ = Total focal length of the first and second lens components in the fourth lens group, and
$f_{D1.3}$ = Total focal length of the first, second and third lens components in the fourth lens group.

The condition (10) is required for making the telephoto ratio small and, at the same time, for keeping spherical aberration favorable. If $f_{D1.2}$ becomes larger than the upper limit of condition (10), it becomes difficult to make the telephoto ratio small. If $f_{D1.2}$ becomes smaller than the lower limit in contrast with the above, spherical aberration will be overcorrected.

The condition (11) is required for making the telephoto ratio small and, at the same time, for keeping Petzval's sum at an adequate value. If $f_{D1.3}$ becomes larger than the upper limit of condition (11), it becomes difficult to make the telephoto ratio small. If $f_{D1.3}$ becomes smaller than the lower limit in contrast with the above, Petzval's sum of zoom lens as a whole becomes too small and curvature of field becomes large.

Lastly, the sixth distance $d_{D6}$ between lens surfaces in the fourth lens group in order from the object side fulfills the following condition.

$$0.12f_D < d_{D6} < 0.22f_D \quad (12)$$

This condition is required for keeping the distance from the final surface of zoom lens to the image surface at adequate value, correcting distortion and axial chromatic aberration and, moreover, keeping Petzval's sum of the zoom lens as a whole at adequate value. If $d_{D6}$ becomes smaller than the lower limit of condition (12), distortion becomes excessively positive. Besides, axial choromatic aberration by rays of short wavelength will be overcorrected. In case of telephoto type lens like the above-mentioned fourth lens group, glass materials with small refractive indices and small Abbe numbers are used for the positive lenses out of the three lens components on the image side and glass material with a large refractive index and a large Abbe number is used for the negative lens. Therefore, when it is attempted to favourably correct the above-mentioned axial choromatic aberration by using actually existing glass materials, it is unavoidable to make Petzval's sum small. If Petzval's sum is made small, curvature of field becomes large.

If $d_{D6}$ becomes larger than the upper limit of condition (12), the distance from the final surface of zoom lens to the image surface becomes too short though it becomes easier to make the telephoto ratio small and, consequently, it becomes impossible to use such zoom lens on ordinary single-lens reflex cameras of 35 mm format. However, it is a matter of course that such a zoom lens can be used on the other types of cameras and, therefore, the condition (12) is not indispensable.

Preferred embodiments of the compact zoom lens according to the present invention which satisfy the above-mentioned conditions are shown below. In the tables below, reference symbol r represents the radius of curvature of lens surface, reference symbol d represents the distance between the lens surface 2nd the next surface to the right, reference symbol n represents the refractive index for d-line, and reference symbol $\nu_d$ represents Abbe's number.

Embodiment 1

Focal length f = 75.532 ~ 150
F number: 4.0
Field angle 2w = 16° ~ 32.8°
(a) First lens group
(b) Variable
(c) Second lens group
(d) Variable
(e) Third lens group
(f) Variable
(g) Fourth lens group

|   |   | r | d | n | vd |
|---|---|---|---|---|---|
| 1 | a | 72.103 | 1.80 | 1.80518 | 25.4 |
| 2 |   | 42.437 | 6.00 | 1.62299 | 58.2 |
| 3 |   | 155.302 | 0.10 |   |   |
| 4 |   | 78.339 | 4.50 | 1,62299 | 58.2 |
| 5 |   | −786.439 | b |   |   |
| 6 | c | −472.427 | 2.50 | 1.80518 | 25.4 |
| 7 |   | −102.327 | 1.20 |   |   |
| 8 |   | −119.002 | 1.00 | 1.69680 | 55.5 |
| 9 |   | 53.678 | 2.60 |   |   |
| 10 |   | −46.650 | 1.00 | 1.69680 | 55.5 |
| 11 |   | 33.097 | 2.80 | 1.80518 | 25.4 |
| 12 |   | 98.419 | d |   |   |
| 13 | e | 90.909 | 3.90 | 1.62299 | 58.2 |
| 14 |   | −38.949 | 1.00 | 1.80518 | 25.4 |
| 15 |   | −71.375 | f |   |   |
| 16 | g | 27.273 | 4.00 | 1.51112 | 60.5 |
| 17 |   | 117.351 | 0.20 |   |   |
| 18 |   | 28.692 | 4.00 | 1.51112 | 60.5 |
| 19 |   | 131.858 | 3.50 |   |   |
| 20 |   | 495.949 | 2.00 | 1.71735 | 29.5 |
| 21 |   | 28.214 | 15.70 |   |   |
| 22 |   | 55.013 | 4.00 | 1.56732 | 42.8 |
| 23 |   | −52.646 | 2.50 |   |   |
| 24 |   | −20.826 | 1.50 | 1.77250 | 49.6 |
| 25 |   | 154.757 | 3.00 |   |   |
| 26 |   | 73.842 | 4.00 | 1.59551 | 39.2 |
| 27 |   | −62.938 |   |   |   |

$d_{i,j}$: Distance between ith lens group and jth lens group

|   | f = 75.532 | f = 100.356 | f = 150 |
|---|---|---|---|
| d1.2 | 3.794 | 14.294 | 24.794 |
| d2.3 | 21.482 | 14.459 | 0.505 |
| d3.4 | 6.161 | 2.685 | 6.138 | fA = 87.300 fB = −30 fC = 75 fD = 97.206
fD1.2 = 35.549 (=0.378fD)
fD1.3 = 94.027 (=0.967fD)
Telephoto ratio = 0.961

Figure 2:
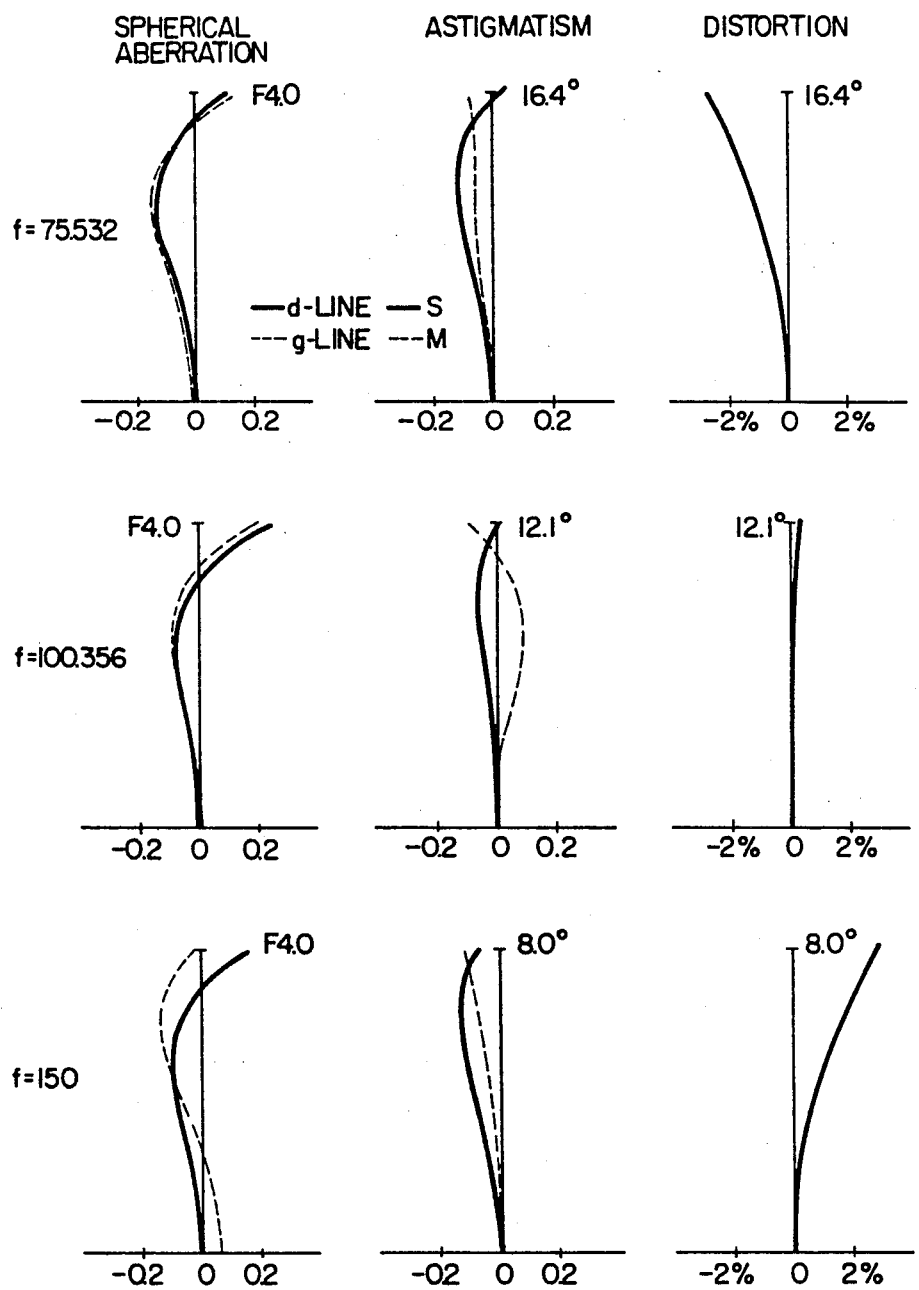

Graphs illustrating the curves of spherical aberration, astigmatism and distortion of Embodiment 1 are shown in FIG. 2.

Embodiment 2

Focal length f = 72.215 ~ 1465
F number = 4.0
Field angle 2 w = 16.2° 34.4°

|   |   | r | d | n | vd |
|---|---|---|---|---|---|
| 1 | a | 64.228 | 1.80 | 1.80518 | 25.4 |
| 2 |   | 39.623 | 6.00 | 1.62299 | 58.2 |
| 3 |   | 203.048 | 0.10 |   |   |
| 4 |   | 101.015 | 3.50 | 1.62299 | 58.2 |
| 5 |   | −1280.761 | b |   |   |
| 6 | c | −348.604 | 2.50 | 1.80518 | 25.4 |
| 7 |   | −111.046 | 2.00 |   |   |
| 8 |   | −160.931 | 1.00 | 1.69680 | 55.5 |
| 9 |   | 53.766 | 2.50 |   |   |
| 10 |   | −44.851 | 1.00 | 1.69680 | 55.5 |
| 11 |   | 32.489 | 2.50 | 1.80518 | 25.4 |
| 12 |   | 99.412 | d |   |   |
| 13 | e | 93.728 | 3.50 | 1.62299 | 58.2 |
| 14 |   | −39.182 | 1.00 | 1.80518 | 25.4 |
| 15 |   | −70.341 | f |   |   |
| 16 | g | 22.869 | 3.80 | 1.51112 | 60.5 |
| 17 |   | 107.930 | 0.20 |   |   |
| 18 |   | 30.775 | 3.80 | 1.51112 | 60.5 |
| 19 |   | 155.311 | 3.40 |   |   |
| 20 |   | −282.485 | 1.90 | 1.71736 | 29.5 |
| 21 |   | 29.142 | 15.00 |   |   |
| 22 |   | 51.265 | 3.80 | 1.54072 | 47.2 |
| 23 |   | −51.175 | 2.40 |   |   |
| 24 |   | −17.964 | 1.50 | 1.77250 | 49.6 |
| 25 |   | 279.981 | 1.00 |   |   |
| 26 |   | 69.907 | 4.00 | 1.59270 | 35.3 |
| 27 |   | −47.295 |   |   |   |

$d_{i,j}$: Distance between ith lens group and jth lens group

|   | f = 72.215 | f = 96.624 | f = 146.5 |
|---|---|---|---|
| d1.2 | 3.030 | 13.830 | 24.630 |
| d2.3 | 21.948 | 14.775 | 0.218 |
| d3.4 | 6.180 | 2.552 | 6.310 | fA = 87.600 fB = −30 fC = 75 fD = 93.280
fD1.2 = 32.596 (=0.360fD)
fD1.3 = 90.497 (=0.970fD)
Telephoto ratio = 0.941

Figure 3:
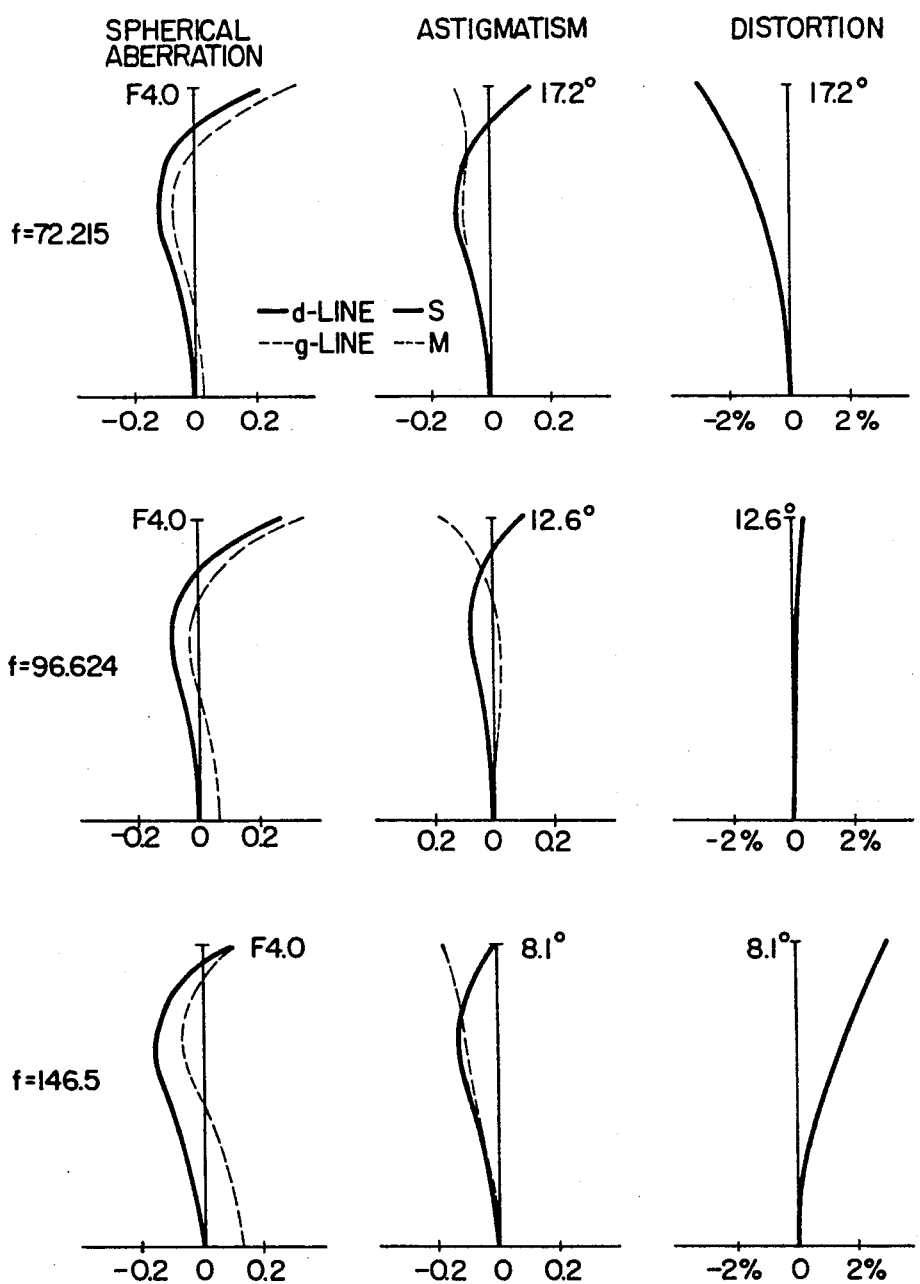
Figure 5A:
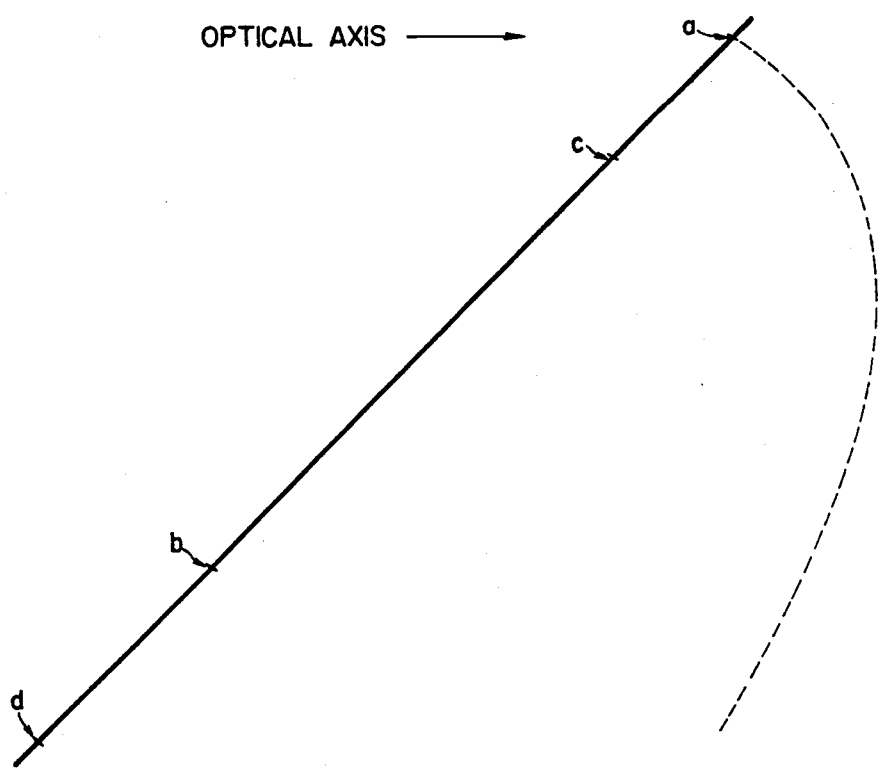
FIG. 5A shows a graph illustrating the loci of movements of the second and third lens groups when varying the focal length.
Figure 5B:
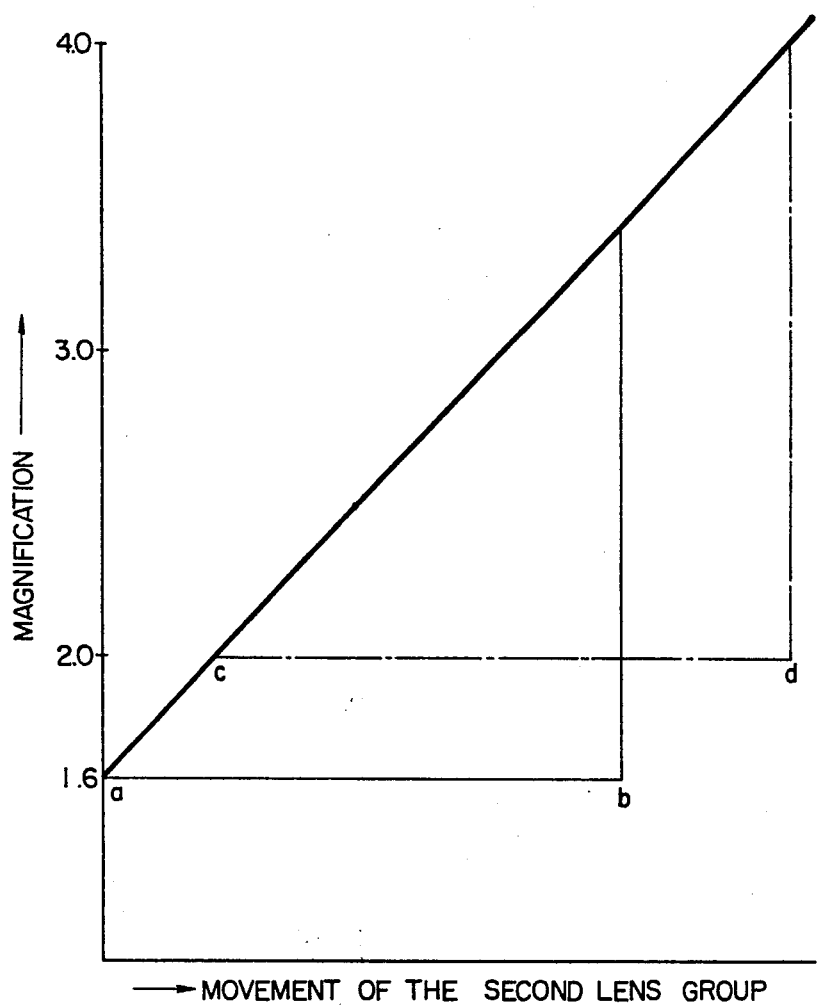
FIG. 5B shows a graph illustrating the relation between the amount of movement of the second lens group and magnification.

Graphs illustrating the curves of spherical aberration, astigmatism and distortion of Embodiment 2 are shown in FIG. 3.

Embodiment 3

Focal length f = 72.221 146.5
F number = 4.0
Field angle 2 w = 16.2° 34.4°

|   |   | r | d | n | vd |
|---|---|---|---|---|---|
| 1 | a | 65.376 | 1.80 | 1.80518 | 25.4 |
| 2 |   | 40.290 | 6.20 | 1.62299 | 58.2 |
| 3 |   | 217.791 | 0.10 |   |   |
| 4 |   | 101.646 | 3.52 | 1.62299 | 58.2 |
| 5 |   | −1360.521 | b |   |   |
| 6 | c | −290.812 | 2.50 | 1.80518 | 25.4 |
| 7 |   | −108.018 | 2.01 |   |   |
| 8 |   | −164.525 | 1.00 | 1.69680 | 55.5 |
| 9 |   | 54.256 | 2.45 |   |   |
| 10 |   | −44.956 | 1.00 | 1.69680 | 55.5 |
| 11 |   | 32.841 | 2.55 | 1.80518 | 25.4 |
| 12 |   | 100.338 | d |   |   |

-continued

|    |   | r        | d     | n       | νd   |
|----|---|----------|-------|---------|------|
| 13 |   | 90.734   | 3.65  | 1.62299 | 58.2 |
| 14 | e | −40.123  | 1.00  | 1.80518 | 25.4 |
| 15 |   | −72.381  | f     |         |      |
| 16 |   | 24.136   | 3.87  | 1.51112 | 60.5 |
| 17 |   | 107.365  | 0.15  |         |      |
| 18 |   | 28.823   | 3.00  | 1.51112 | 60.5 |
| 19 |   | 115.031  | 4.00  |         |      |
| 20 |   | ∞        | 1.90  | 1.71736 | 29.5 |
| 21 |   | 28.170   | 15.00 |         |      |
| 22 | g | 52.379   | 3.80  | 1.56732 | 42.8 |
| 23 |   | −52.379  | 2.40  |         |      |
| 24 |   | −19.037  | 1.50  | 1.77250 | 49.6 |
| 25 |   | 230.640  | 2.40  |         |      |
| 26 |   | 73.097   | 4.50  | 1.59551 | 39.2 |
| 27 |   | −55.397  |       |         |      |

$d_{i-j}$: Distance between ith lens group and jth lens group

|      | f = 72.221 | f = 97.824 | f = 146.5 |
|------|------------|------------|-----------|
| d1.2 | 3.055      | 14.275     | 24.715    |
| d2.3 | 21.968     | 14.466     | 0.300     |
| d3.4 | 6.310      | 2.592      | 6.318     | fA = 87.720  fB = −30  fC = 75  fD = 93.259
fD1.2 = 33.893   (=0.373fD)   fD1.3 = 90.933
(=0.975fD)

Telephoto ratio = 0.955

Graphs illustrating the curves of spherical aberration, astigmatism and distortion of Embodiment 3 are shown in FIG. 4.

I claim:

1. A compact zoom lens having, in order from the object side, a first positive lens group for focusing, a second negative lens group for variation of focal length, a third positive lens group for compensation of image position, and a fourth positive lens group for imaging, said compact zoom lens being a mechanical compensation type zoom lens arranged so that said second lens group is moved in the direction of the optical axis for the purpose of varying the focal length and so that the variation of final image position to be caused by the above movement is compensated for by moving said third lens group to form a locus of points concave toward the object side, said first lens group having a two-component, three-element lens configuration with one lens component composed of a positive cemented doublet consisting of a negative lens and a positive lens and the other lens component consisting of a positive lens; said second lens group having a three-component, four-element lens configuration with first, second and third lens components in order from the object side, said first lens component being a positive meniscus lens concave toward the object side, said second lens component being a negative biconcave lens having a concave surface with a small radius of curvature arranged toward the image side, and said third lens component being a negative cemented doublet consisting of a negative biconcave lens and a positive meniscus lens concave toward the image side; said third lens group comprising at least one positive lens; and said compact zoom lens fulfilling the following conditions:

$-\infty < r_{B1} < -7|f_B|$ $-5|f_B| < r_{B2} < -3|f_B|$ $-6|f_B| < r_{B3} < -3|f_B|$ $d_{B2} < 0.12|f_B|$ wherein, $r_{Bi}$ is the radius of curvature of the ith lens surface in said second lens group in order from the object side, $d_{Bi}$ is the ith distance between lens surfaces in said second lens group in order from the object side, and $f_B$ is the focal length of said second lens group as a whole.

2. A compact zoom lens according to claim 1 wherein said fourth lens group has a six component, six-element lens configuration comprising first, second, third, fourth, fifth and sixth lens components in order from the object side, said first and second lens components of said fourth lens group being positive meniscus lenses concave toward the image side, said third lens component of said fourth lens group being a negative lens having a concave surface with a small radius of curvature arranged toward the image side, said fourth lens component of said fourth lens group being a positive biconvex lens having a large airspace with respect to said third lens component, said fifth lens component of said fourth lens group being a biconcave lens having a concave surface with a small radius of curvature arranged toward the object side, and said sixth lens component of said fourth lens group being a biconvex lens; and with said fourth lens group fulfilling the following conditions:

$0.2f_D < r_{D1} < 0.32f_D$ $0.25f_D < r_{D3} < 0.35f_D$ $1.45 < n_{D1} < 1.6$ $1.45 < n_{D2} < 1.6$ $1.65 < n_{D3}$ $0.12f_D < d_{D6} < 0.22f_D$ wherein, $r_{Di}$ is the radius of curvature of the ith lens surface in said fourth lens group in order from the object side, $d_{Di}$ is the ith distance between lens surfaces in said fourth lens group in order from the object side, $n_{Di}$ is the refractive index of the ith lens in said fourth lens group in order from the object side, and $f_D$ is the focal length of said fourth lens group.

3. A compact zoom lens according to claim 2 and further fulfilling the following conditions:

$0.31f_D < f_{D1.2} < 0.4f_D$ $0.9f_D < f_{D1.3} < 1.1f_D$ wherein, $f_{D1.2}$ is the total focal length of said first and second lens components in said fourth lens group, and $f_{D1.3}$ is the total focal length of said first, second and third lens components in said fourth lens group.

4. A compact zoom lens according to claim 2 in which said third lens group comprises a positive cemented doublet consisting of a positive lens and a negative lens, and wherein said compact zoom lens is characterized by the following numerical data:

|   |   | r | d | n | vd |
|---|---|---|---|---|---|
| 1 |   | 72.103 | 1.80 | 1.80518 | 25.4 |
| 2 |   | 42.437 | 6.00 | 1.62299 | 58.2 |
| 3 | a | 155.302 | 0.10 |   |   |
| 4 |   | 78.339 | 4.50 | 1.62299 | 58.2 |
| 5 |   | −786.439 | b |   |   |
| 6 |   | −472.427 | 2.50 | 1.80518 | 25.4 |
| 7 |   | −102.327 | 1.20 |   |   |
| 8 |   | −119.002 | 1.00 | 1.69680 | 55.5 |
| 9 | c | 53.678 | 2.60 |   |   |
| 10 |   | −46.650 | 1.00 | 1.69680 | 55.5 |
| 11 |   | 33.097 | 2.80 | 1.80518 | 25.4 |
| 12 |   | 98.419 | d |   |   |
| 13 |   | 90.909 | 3.90 | 1.62299 | 58.2 |
| 14 | e | −38.949 | 1.00 | 1.80518 | 25.4 |
| 15 |   | −71.375 | f |   |   |
| 16 |   | 27.273 | 4.00 | 1.51112 | 60.5 |
| 17 |   | 117.351 | 0.20 |   |   |
| 18 |   | 28.692 | 4.00 | 1.51112 | 60.5 |
| 19 |   | 131.858 | 3.50 |   |   |
| 20 |   | 495.949 | 2.00 | 1.71735 | 29.5 |
| 21 |   | 28.214 | 15.70 |   |   |
| 22 | g | 55.013 | 4.00 | 1.56732 | 42.8 |
| 23 |   | −52.646 | 2.50 |   |   |
| 24 |   | −20.826 | 1.50 | 1.77250 | 49.6 |
| 25 |   | 154.757 | 3.00 |   |   |
| 26 |   | 73.842 | 4.00 | 1.59551 | 39.2 |
| 27 |   | −62.938 |   |   |   |

5. A compact zoom lens according to claim 2 in which said third lens group comprises a positive cemented doublet consisting of a positive lens and a negative lens, and wherein said compact zoom lens is characterized by the following numerical data:

|   |   | r | d | n | vd |
|---|---|---|---|---|---|
| 1 |   | 64.228 | 1.80 | 1.80518 | 25.4 |
| 2 |   | 39.623 | 6.00 | 1.62299 | 58.2 |
| 3 | a | 203.048 | 0.10 |   |   |
| 4 |   | 101.015 | 3.50 | 1.62299 | 58.2 |
| 5 |   | −1280.761 | b |   |   |
| 6 |   | −348.604 | 2.50 | 1.80518 | 25.4 |
| 7 |   | −111.046 | 2.00 |   |   |
| 8 |   | −160.931 | 1.00 | 1.69680 | 55.5 |
| 9 | c | 53.766 | 2.50 |   |   |
| 10 |   | −44.851 | 1.00 | 1.69680 | 55.5 |
| 11 |   | 32.489 | 2.50 | 1.80518 | 25.4 |
| 12 |   | 99.412 | d |   |   |
| 13 |   | 93.728 | 3.50 | 1.62299 | 58.2 |
| 14 | e | −39.182 | 1.00 | 1.80518 | 25.4 |
| 15 |   | −70.341 | f |   |   |
| 16 |   | 22.869 | 3.80 | 1.51112 | 60.5 |
| 17 |   | 107.930 | 0.20 |   |   |
| 18 |   | 30.775 | 3.80 | 1.51112 | 60.5 |
| 19 |   | 155.311 | 3.40 |   |   |
| 20 |   | −282.485 | 1.90 | 1.71736 | 29.5 |
| 21 |   | 29.142 | 15.00 |   |   |
| 22 | g | 51.265 | 3.80 | 1.54072 | 47.2 |
| 23 |   | −51.175 | 2.40 |   |   |
| 24 |   | −17.964 | 1.50 | 1.77250 | 49.6 |
| 25 |   | 279.981 | 1.00 |   |   |
| 26 |   | 69.907 | 4.00 | 1.59270 | 35.3 |
| 27 |   | −47.295 |   |   |   |

6. A compact zoom lens according to claim 2 in which said third lens group comprises a positive cemented doublet consisting of a positive lens and a negative lens, and wherein said compact zoom lens is characterized by the following numerical data:

|   |   | r | d | n | vd |
|---|---|---|---|---|---|
| 1 |   | 65.376 | 1.80 | 1.80518 | 25.4 |
| 2 |   | 40.250 | 6.20 | 1.62299 | 58.2 |
| 3 | a | 217.791 | 0.10 |   |   |
| 4 |   | 101.646 | 3.52 | 1.62299 | 58.2 |
| 5 |   | −1360.521 | b |   |   |
| 6 |   | −290.812 | 2.50 | 1.80518 | 25.4 |
| 7 |   | −108.018 | 2.01 |   |   |
| 8 |   | −164.525 | 1.00 | 1.69680 | 55.5 |
| 9 | c | 54.256 | 2.45 |   |   |
| 10 |   | −44.956 | 1.00 | 1.69680 | 55.5 |
| 11 |   | 32.841 | 2.55 | 1.80518 | 25.4 |
| 12 |   | 100.338 | d |   |   |
| 13 |   | 90.734 | 3.65 | 1.62299 | 58.2 |
| 14 | e | −40.123 | 1.00 | 1.80518 | 25.4 |
| 15 |   | −72.381 | f |   |   |
| 16 |   | 24.136 | 3.87 | 1.51112 | 60.5 |
| 17 |   | 107.365 | 0.15 |   |   |
| 18 |   | 28.823 | 3.00 | 1.51112 | 60.5 |
| 19 |   | 115.031 | 4.00 |   |   |
| 20 |   | ∞ | 1.90 | 1.71736 | 29.5 |
| 21 |   | 28.170 | 15.00 |   |   |
| 22 | g | 52.379 | 3.80 | 1.56732 | 42.8 |
| 23 |   | −52.379 | 2.40 |   |   |
| 24 |   | −19.037 | 1.50 | 1.77250 | 49.6 |
| 25 |   | 230.640 | 2.40 |   |   |
| 26 |   | 73.097 | 4.50 | 1.59551 | 39.2 |
| 27 |   | −55.397 |   |   |   |

* * * * *